United States Patent Office 2,903,493
Patented Sept. 8, 1959

2,903,493

NEW DIARYLMETHANE DERIVATIVES, THEIR MANUFACTURE AND APPLICATION

Arthur Lambert and Boris Nicholas Leyland, Manchester, England, assignors to Imperial Chemical Industries Limited, London, England, a corporation of Great Britain No Drawing. Application December 19, 1955
Serial No. 553,706

Claims priority, application Great Britain
December 24, 1954

4 Claims. (Cl. 260—810)

This invention relates to new chemical compounds namely bis-(2-hydroxy-3-α-alkylcycloalkyl-5-ethylphenyl)-methanes in which the cycloalkyl groups which may be the same or different are cyclopentyl, methylcyclopentyl, cyclohexyl or methylcyclohexyl and the alkyl substituent has not more than 4 carbon atoms and is attached to the α-carbon atom of the cycloalkyl group, i.e. the carbon atom which is joined to the phenyl radical.

The invention also relates to the manufacture of these new compounds.

We have found that these compounds are both valuable antiagers for natural and synthetic rubbers, polyethylene, and for those oils, fats and waxes which tend to deteriorate in the presence of oxygen and valuable intermediates for the manufacture of other compounds, including other antiagers, e.g. metal salts of the above new compounds.

The new compounds are, according to one process of the invention, manufactured in two stages. The first stage consists of combining, in the presence of an acid condensing agent, 1 molecular proportion of p-ethylphenol with 1 molecular proportion of an α-alkylcyclopentene, methyl-α-alkylcyclopentene, α-alkylcyclohexene or methyl-α-alkylcyclohexene, in which the alkyl substituent has not more than 4 carbon atoms. In the second stage, two molecular proportions of the p-ethylphenol derivative, i.e. 2-α-alkylcycloalkyl-4-ethylphenol, which is obtained in the first stage, are condensed with one molecular proportion of formaldehyde or of a substance yielding formaldehyde, in the presence of an acid condensing agent.

As an alternative for the second stage one molecular proportion of the aforesaid p-ethylphenol derivative is condensed with one molecular proportion of formaldehyde in the presence of a basic catalyst and the resulting product combined with one molecular proportion of the same or a different p-ethylphenol derivative in the presence of an acid condensing agent.

As a further alternative for the second stage a chloromethyl substituent is introduced in to the p-ethylphenol derivative by reacting it with one molecular proportion of formaldehyde in the presence of anhydrous hydrogen chloride and the resulting chloromethyl derivative is then condensed with a second molecular proportion of the same or a different p-ethylphenol derivative.

These alternatives for the second stage provide convenient ways of manufacturing such of the new compounds of this invention as are not symmetrical, i.e. those compounds in which the two α-alkylcycloalkyl substituents are different.

The new compounds have not only excellent preservative properties in rubbers and produce little or no staining but they have excellent physical properties also which make them well adapted for use in the mechanical processes employed in manufacturing rubber articles. They are also well adapted for addition to latices of both natural and synthetic rubber, and may be used for stabilisation of the latter prior to coagulation.

The antioxidants are employed in the manufacture of rubber articles according to the usual methods. Thus they may for example be mixed with the rubber along with vulcanising and other ingredients and the resulting mixes then cured by heat treatment, or they may be mixed along with other compounding ingredients and the mixture vulcanised by treatment with sulphur monochloride in the cold. The antioxidants are effective in proportions of from ¼ to 2 percent of the weight of the rubber.

The synthetic rubbers which may be used include for example polymers of butadiene-1:3-isobutene and 2-chlorobutadiene-1:3- and copolymers of either of these compounds with acrylonitrile, styrene, methylmethacrylate and other well known polymerisable compounds which are used in the manufacture of these rubbers.

The invention also relates to the application of the new compounds as antioxidants for natural and synthetic rubber.

The following examples in which the parts are by weight illustrate but do not limit the invention.

*Example 1* p-Ethylphenol (26 parts) and sulphuric acid (98%:0.7 part) are mixed at 50° C., and 1-methylcyclohexene (20.5 parts) is added slowly with stirring at 35–45° C. After the addition, the mixture is stirred for 18 hours and is then heated with aqueous sodium hydroxide (23%:42 parts) at 100–110° C. for ½ hour. The mixture is diluted with water and the crude condensate is isolated by extraction with benzene. By distillation of the extract, 2-α-methylcyclohexyl-4-ethylphenol is obtained, B.P. 178–190° C./15 mm.

2-α-methylcyclohexyl-4-ethylphenol (20 parts) is stirred with formaldehyde (37%:4.2 parts) and hydrochloric acid (35%:1.68 part) at 65–75° C. for 3 hours. The product is taken up in benzene, washed with aqueous sodium bicarbonate solution and with water. On distillation of the benzene solution bis-(2-hydroxy-3-α-methylcyclohexyl-5-ethylphenyl)-methane is obtained, B.P. 200–240° C./0.2 mm., melting point after crystallisation from petroleum ether (B.P. 40–60° C.) 84–86.5° C.

*Example 2*

Working by methods analogous to that of the above example, but using homologues of the starting materials of that example, or other similar starting materials in accordance with the invention, there may be obtained other antioxidants.

The substitution of α-n-butylcyclohexene for α-methylcyclohexene yields bis-(2-hydroxy-3-α-n-butylcyclohexyl-5-ethylphenyl)-methane.

Similarly the substitution of α-methylcyclopentene for α-methylcyclohexene gives bis-(2-hydroxy-3-α-methylcyclopentyl-5-ethylphenyl)-methane. Also the substitution of the α-methylcyclohexene by αγ-dimethylcyclohexene (made by dehydrating 1:4-dimethylcyclohexanol) and by α-ethylcyclohexene yield bis-(2-hydroxy-3-αγ-dimethylcyclohexyl-5-ethylphenyl)-methane and bis-(2-hydroxy-3-α-ethylcyclohexyl-5-ethylphenyl)-methane respectively.

*Example 3*

2-α-methylcyclohexyl-4-ethylphenol is added to an aqueous solution of formaldehyde and potassium hydroxide, the three compounds being in equimolecular proportions. Methanol is added until a clear solution is obtained and the solution left overnight. The mixture is then neutralised with acid. The 2-hydroxy-3-α-methylcyclohexyl-5-ethylbenzyl alcohol which separates is then stirred for several hours with an equimolecular proportion of 2-α-methylcyclohexyl-4-ethylphenol in petroleum ether to which a little concentrated hydrochloric acid has been added. The solid bis-(2-hydroxy-3-α-methylcyclohexyl-5-ethylphenyl)-methane which separates is filtered off.

Example 4

The 2-hydroxy-3-α-methylcyclohexyl-5-ethylbenzyl alcohol which is obtained in Example 3 is converted to the corresponding benzyl chloride by treating a solution of it in ether with concentrated hydrochloric acid at a temperature below 5° C. Equimolecular proportions of 2-α-methylcyclohexyl-4-ethylphenol and the benzyl chloride derivative are then interacted in the cold in an inert medium. The product is the same as that of Example 3.

Example 5

Vulcanisable rubber stocks of the following compositions were prepared by the usual process of mixing, using bis-(2-hydroxy-3-α - methylcyclohexyl - 5 - ethylphenyl)-methane as antioxidant and also using no antioxidant.

| Mix | Parts | |
|---|---|---|
| | A | B |
| Pale crepe natural rubber | 100 | 100 |
| Zinc oxide | 10 | 10 |
| Blanc fixe | 75 | 75 |
| Stearic acid | 1 | 1 |
| Sulphur | 3 | 3 |
| Diphenylguanidine | 0.5 | 0.5 |
| Bis-(2-hydroxy-3-α-methylcyclohexyl-5-ethylphenyl)-methane | 1 | |

Sheets of each mix were cured for 75 minutes at 141° C. and ageing tests carried out on the vulcanisates. The results of the ageing tests were as follows:

| | Tensile strength (kg./cm.²) | |
|---|---|---|
| | Mix A | Mix B |
| Unaged | 173 | 176. |
| Aged in an oxygen bomb at 70° C. and 300 p.s.i. pressure for 8 days | 89 | Perished. |
| Aged in an oxygen bomb at 70° C. and 300 p.s.i. pressure for 12 days | 61 | Do. |
| Aged in an oxygen bomb at 70° C. and 300 p.s.i. pressure for 16 days | 43 | Do. |

Example 6

To show the non-staining properties of the antioxidants, vulcanisable rubber stocks of the following compositions were prepared by the usual process of mixing, using bis-(2-hydroxy-3-α-methylcyclohexyl-5-ethylphenyl)-methane and also no antioxidant.

| Mix | A | B |
|---|---|---|
| Pale crepe natural rubber | 100 | 100 |
| Zinc oxide | 10 | 10 |
| Blanc fixe | 75 | 75 |
| Stearic acid | 1 | 1 |
| Titanium dioxide | 10 | 10 |
| Zinc diethyldithiocarbamate | 0.375 | 0.375 |
| Bis-(2-hydroxy-3-α-methylcyclohexyl-5-ethylphenyl)-methane | 1 | |

A sheet of each mix was cured for 12 minutes at 125° C. Samples of the vulcanised sheets were exposed outdoors with the following results:

| | Mix A | Mix B |
|---|---|---|
| Exposed outdoors for 1 week | Equal to blank test | Very pale cream. |
| Exposed outdoors for 2 weeks | do | Pale cream. |
| Exposed outdoors for 4 weeks | do | Do. |

The above results show that the antioxidant does not cause any staining at all.

Example 7

As an illustration of the use of the antioxidants in synthetic rubbers the following mix was made up:

| | Parts |
|---|---|
| Neoprene GN | 100 |
| Magnesium oxide | 4 |
| Stearic acid | 0.5 |
| China clay | 25 |
| Whiting | 25 |
| Petroleum jelly | 2 |
| Pale cumar resin | 8 |
| Titanium dioxide | 15 |
| Zinc oxide | 5 |
| Antioxidant of Example 1 | 1 |

Cure was effected at 153° C. for 30 minutes.

Example 8

Rubber films were prepared by drying on glass plates from the following mixes:

| | Parts |
|---|---|
| 60% natural rubber latex | 167 |
| 20% aqueous solution of cetyl alcohol-ethylene oxide condensation product | 1.0 |
| 50% aqueous dispersion of sulphur | 2.0 |
| 50% aqueous dispersion of zinc oxide | 3.0 |
| 50% aqueous dispersion of zinc diethyl dithiocarbamate | 2.0 |
| 20% aqueous dispersion of the antioxidant of Example 1 | 5.0 |

The films were vulcanized for 30 minutes in air at 100° C.

What we claim is:

1. A composition comprising an oxygen-susceptible natural rubber having incorporated therein at least one bis - (2 - hydroxy - 3 - α - alkylcycloalkyl - 5 - ethylphenyl)-methane in which the cycloalkyl groups are selected from the class consisting of cyclopentyl, methylcyclopentyl, cyclohexyl and methylcyclohexyl and the alkyl substituent has not more than 4 carbon atoms and is attached to the α-carbon atom of the cycloalkyl group.

2. The composition of claim 1, wherein said methane is bis - (2-hydroxy-3-α-methylcyclohexyl-5-ethylphenyl)-methane.

3. The composition of claim 1, wherein said methane is bis - (2-hydroxy-3-α-methylcyclopentyl-5-ethylphenyl)-methane.

4. The composition of claim 1, wherein the proportion of the antioxidant is ¼ to 2 percent of the weight of said rubber.

References Cited in the file of this patent

UNITED STATES PATENTS

| 2,734,924 | Lambert | Feb. 14, 1956 |
| 2,748,096 | Lambert et al. | May 29, 1956 |